Jan. 18, 1966   M. LAVELL   3,230,444
ELECTRICAL REGULATING CIRCUITS
Filed July 13, 1962

INVENTOR.
MAURICE LAVELL
BY Fraser and Bogucki
ATTORNEYS

# United States Patent Office 3,230,444
Patented Jan. 18, 1966

3,230,444
ELECTRICAL REGULATING CIRCUITS
Maurice Lavell, La Puente, Calif., assignor of one-third
each to Phil L. Wood and Orville A. Kohlmeir
Filed July 13, 1962, Ser. No. 209,665
4 Claims. (Cl. 322—73)

This invention relates to electrical regulating circuits and more specifically to transistor circuits for regulating both alternating current (A.C.) and direct current (D.C.) power sources.

The utility of power supply regulating circuits is well established. In many applications where extremely stable operating voltages or constant currents are needed, it is essential that some regulation of the power supplied from generating station power lines or from a portable or mobile generator be provided in order to achieve greater stability than is generally provided by such power sources. Even in applications where regulation is not absolutely essential, the operation of associated equipment is oftentimes improved by the provision of at least a modicum of power supply regulation. Regulation of voltage or current is particularly important for portable and mobile power sources since the inherent stability of the output of such sources is relatively poor over reasonable load variations. One particularly familiar example may be found in the case of an automobile electrical system which utilizes one or more electromechanical regulators to control the voltage and current provided by the engine-driven generator.

Such regulating circuits as as known for use in conjunction with portable or mobile generators, either A.C. or D.C., and which may be driven either by electric motors connected to the power mains or by prime movers such as gasoline or diesel engines, have not proven to be completely satisfactory. In general it is desired to maintain the output voltage of such a generator at a substantially constant level. For generators driven as described, suitable voltage regulation is no mean task when it is considered that the load imposed upon the generator may vary from zero to load currents somewhat in excess of the full load rating and further that the output characteristic of such a generator is inherently such as to produce a difference in output voltage depending upon the load being drawn from the generator. In addition to achieving appropriate regulation of generator output voltage over such a wide variation of load current, a useful voltage regulator for such a power source must necessarily be economically priced in view of the comparatively low cost of the generator itself; it must be reliable in operation; and it should achieve stability in operating characteristics over a wide range of ambient temperature conditions and varying environment.

It is therefore a general object of this invention to provide a stable and reliable, low cost regulating circuit which is suitable for use with a portable or mobile generator.

A further object of the invention is to provide a voltage regulating circuit which is capable of responding to fluctuations in the output voltage of the mobile generator in a minimum time.

Another object of the invention is to provide a compact, low cost voltage regulating circuit for use with a generator power source which is relatively independent of ambient temperature changes.

A still further object of the invention is to provide a voltage regulating circuit which operates without any moving parts to control the output voltage of an associated A.C. or D.C. generator.

Briefly considered, the regulation of the output voltage of a particular power generator is provided, in accordance with the invention, through the control of the generator field current in response to signals derived from a sensing circuit which is arranged to monitor the output voltage of the generator. In accordance with an aspect of the invention, a constant potential reference voltage is developed with which the sampled output voltage may be compared at a selected level. A difference signal derived as a result of this comparison is inverted, amplified and applied to a second transistor amplifier for further comparison with a second signal sampled directly from the generator output voltage. The resulting control signal is applied to a third transistor amplifier which is arranged to control the generator field current to compensate for the observed fluctuation in generator output voltage.

The use of the amplified and inverted difference signal for a further comparison in the second amplifier in the manner described advantageously serves to provide an increased sensitivity and speed of response for voltage regulator circuits in accordance with the invention which render such circuits particularly feasible for use with portable or mobile generator power sources. In accordance with a further aspect of the invention, the device which is employed as a constant potential reference is arranged to be temperature compensated and operated within a region of its voltage-current characteristic curve which exhibits a negligible temperature coefficient, Thus, voltage regulator circuits in accordance with the the invention achieve an improved stability of operation over a wide range of ambient temperatures. In accordance with a further aspect of the invention, suitable protection of those transistors which are subject to possibly damaging transient voltages is provided through the use of a serially connected isolating rectifier and a shunt connected, double diode clipper.

In certain exemplary arrangements of the invention, although the output or control transistor which is connected to control the field current of the associated generator is arranged to present the desired impedance in series with the generator field circuit and thus effect appropriate regulation of the generator ouput voltage, an additional low impedance path is connected in shunt with the output transistor in order to insure the adequate build up of the generator field during the starting of a self-excited generator arrangement and also to lower the power dissipation which is experienced in the output transistor. By means of this arrangement in the accordance with the invention, the power handling capabilities imposed upon transistors which may be used in the output stage are held to a relatively low level.

One particular arrangement in accordance with the invention utilizes a regulator circuit including three transistors in conjunction with a three phase alternator (A.C. generator) having a self-excited D.C. exciter which is driven to rotate with the alternator to supply the field current thereof. Voltages proportional to the generator output voltage are derived via a three phase sensing transformer and rectified for optimum regulation of all three phases. The rectified voltage is then applied to the sampling and comparison portions of the regulator circuit from whence a control signal is derived for application to the output or control transistor. The output transistor is connected in series with the exciter field winding across the D.C. output terminals of the exciter. Thus the exciter field current is controlled in response to signals developed from the alternator output terminals and the output voltage from the exciter is varied in accordance therewith to produce a corresponding change in the field current of the alternator to compensate for any fluctuations in alternator output voltage which may have occurred. The exciter output voltage is also fed back to the input of the regulator circuit so that stabilization of exciter voltage may be effected in addition to regulation of the alternator output.

A second specific arrangement of the invention provides three transistors arranged in a regulator circuit in conjunction with a single phase alternator. A voltage proportional to the output voltage of the alternator is rectified and applied to the circuit to develop a suitable control signal. In this arrangement in accordance with the invention, the control transistor is connected in series with the control winding of a magnetic amplifier, the main winding of which is arranged to vary the field current of the alternator in accordance with control signals developed by the voltage regulator circuit.

A third particular arrangement in accordance with the invention provides a voltage regulator circuit in conjunction with a D.C. generator. The regulator portion of the circuit is arranged to sample the output voltage of the generator, and the output or control transistor is connected in series with the field winding of the generator across the generator output terminals so that fluctuations of output voltage may be appropriately compensated for through adjustment of the generator field current. A considerable simplification of the required circuitry is achieved in this particular arrangement of the invention through the elimination of the sensing transformers and rectifiers of the other arrangements which are designed for use with alternators. Because of the simplicity of the circuitry provided in this arrangement of the invention and the desirable regulating characteristic afforded thereby, this circuit is particularly suitable for use in conjunction with the D.C. generator of an automobile electrical system.

In each of the above-described arrangements in accordance with the invention, particular adjustments are provided in the form of variable resistive elements which permit voltage regulation to be effected at a selected value within the range of the device. Furthermore, these adjustments may be set so that various selected operating characteristics may be achieved for the particular generators being regulated; that is, the output characteristic may be arranged by means of these adjustments to provide a substantially constant output voltage over the range of load demands upon the generator or the output voltage may be made to either increase or decrease in proportion to the amount of current being drawn from the generator.

A better understanding of the invention may be had from a consideration of the following detailed description, taken in conjunction with the accompanying drawings in which like elements are designated by like reference numerals and in which.

Figure 1:
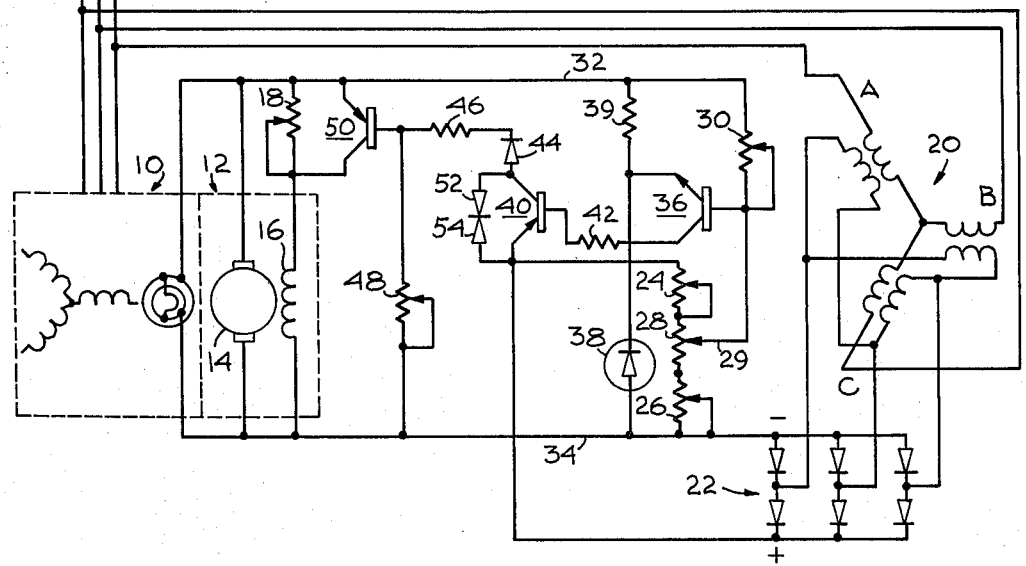
FIG. 1 is a schematic diagram of an exemplary circuit in accordance with the invention showing a regulator arranged with a D.C. exciter generator to control the output voltage of a three phase alternator.

The arrangement in accordance with the invention represented in FIG. 1 includes a self-excited, D.C. generator 12 having an armature winding 14 connected to furnish excitation current to the field winding of a three phase alternator 10. The generator or exciter 12 has a field winding 16 connected across the armature winding 14 via a parallel arrangement of a variable resistor 18 and a control or output transistor 50 so that the exciter output (and thereby the alternator output) may be varied through control of the current in the field winding 16.

The arrangement of FIG. 1 includes a regulator circuit which senses the output voltage provided by the alternator 10 to compensate for fluctuations thereof. A three phase transformer 20 and full wave rectifier 22 are arranged in a conventional manner to develop a unidirectional voltage corresponding to the three phase output voltage provided by the alternator 10. It should be noted that a conventional single phase transformer may be employed in place of the transformer 20 to monitor only a single phase of the three phase output signal if desired.

The unidirectional voltage furnished by the rectifier 22 is impressed across two variable resistors 24 and 26 and a potentiometer 28 which has an adjustable output terminal 29. The terminal 29 is connected by a potentiometer 30 to a conductor 32 while the resistor 26 is connected to a conductor 34. The conductors 32 and 34 are connected to the two output terminals of the D.C. exciter 12.

The terminal 29 is also connected to the base terminal of an NPN transistor 36 (which may be a silicon junction transistor), the emitter terminal of which is connected to the conductor 34 via a temperature-compensated zener diode 38. The diode 38 provides a constant potential reference voltage which is thus maintained stable over a range of ambient temperature variations. Accordingly the emitter terminal of the transistor 36 is held at a constant potential difference from the conductor 34 independent of ambient temperature fluctuations. A resistor 39 connects the zener diode 38 to the conductor 32 to complete the current path therefor.

In view of the fact that the potential difference between the conductor 34 and the terminal 29 (and thus the base of the transistor 36) varies directly with the potential provided by the rectifier 22 while the potential difference between the conductor 34 and the emitter of the transistor 36 remains constant, the base terminal will become more positive with respect to the emitter terminal as the output voltage of the alternator 10 increases. Accordingly the transistor 36 achieves a comparison between the reference potential of the diode 38 and the voltage derived from the alternator output and applied to the base of transistor 36. Thus, the collector terminal potential increases as the output voltage of the alternator decreases and decreases as the alternator voltage increases, effecting an inversion of the voltage change applied to the base of the transistor 36.

It should be noted that the resistors 24, 26 and 30 may all be varied to control the operation of the transistor 36. For example, the bias potential applied to the base terminal may be controlled by the setting of the resistor 30, while the exact proportion of the voltage furnished by the rectifier 22 to the base terminal may be accurately selected by the setting of the resistors 24 and 26. The value of the resistor 30 determines what proportion of D.C. exciter voltage is made available at the base of the transistor 36 for combination with the voltage derived from the alternator output. It has been found advantageous to select the potentiometer 28 to have a range of resistances which is relatively small with respect to the values of the resistors 24 and 26 so that precise proportions of the rectifier voltage applied at the base terminal of the transistor 36 may be easily selected.

The collector terminal of the transistor 36 is connected to the base terminal of a PNP transistor 40 (which may be a low power germanium junction transistor) by a resistor 42. The transistor 40 has its emitter terminal connected directly to the positive voltage side of the rectifier 22 and provides a second comparison for the unidirectional voltage derived from the alternator output. Thus, as the voltage furnished by the rectifier 22 increases, the emitter terminal of the transistor 40 receives a more positive potential while the base terminal of the transistor 40 receives a more negative potential through the inverting action of the transistor 36. As the voltage furnished by the rectifier 22 decreases, the potential changes at the emitter and base terminals respectively of the transistor 40 are reversed. In either case, however, the net effect on the base-emitter junction of the transistor 40 is cumulative, so that it reacts to the changes in an extremely rapid response and with increased sensitivity.

For example, as the rectifier voltage increases and the emitter terminal of the transistor 40 becomes more positive with respect to the base terminal, the transistor 40 immediately begins to conduct more collector current. On the other hand, as the rectifier voltage decreases and the emitter terminal becomes less positive with respect to the base terminal, the transistor 40 immediately begins to conduct less collector current. The collector terminal of the transistor 40 is connected to the conductor 34 through a diode 44 connected in series with a resistor 46 and a variable resistor 48. As the collector current of the transistor 40 varies, the changes will be reflected by changes in the voltage across the resistor 48; e.g., as collector current increases, the voltage across the resistor 48 increases, while as collector current decreases, the voltage decreases. The voltage drop across the resistor 48 is applied to the base terminal of a PNP transistor 50 (which may be a low power germanium junction transistor), connected as an output or control transistor. The transistor 50 has its emitter terminal connected to the conductor 32 and its collector terminal connected to the field winding 16 of the D.C. exciter 12 so that field current of the exciter 12 is controlled by the transistor 50.

As the voltage furnished by the rectifier 22 becomes greater in response to an increase in alternator output voltage, the collector current of the transistor 40 and the voltage across the resistor 48 are increased so that the base terminal of the transistor 50 becomes more positive with respect to the emitter terminal and the transistor 50 becomes less conductive. The decrease in conductivity results in less current being furnished to the field winding 16. A decrease in the field current of the winding 16 results in less field current supplied to the alternator 10 so that the output of the alternator 10 is reduced to compensate for the initial change. On the other hand, a decreased voltage from the rectifier 22 causes a corresponding increase in the conduction of generator field current by the transistor 50 and an increased output from the alternator 10.

Thus, the control circuit of FIG. 1 in cooperation with the generator 14 provides effective regulation of the output voltages furnished by the alternator 10. Certain other aspects of the arrangement should also be especially noted. For example, the gain of the transistors 36 and 50 may be varied by changing the setting of the variable resistors 30 and 48. This allows the characteristic of the current furnished to the field winding 16 to be selectively adjusted to provide regulation at a constant level or with an increasing or decreasing characteristic with respect to load current, as desired. Furthermore, the entire arrangement comprises only a few components of small size which may be arranged in a physically compact grouping. The small number of components tends to increase circuit reliability as does the use of the temperature compensated diode 38.

The diode 44 at the collector terminal of the transistor 40 protects against wrong polarity "punch through" voltages at the transistor 50 and isolates the sensing or comparison portion of the arrangement from the control portion. In addition, a pair of zener diodes 52 and 54 are arranged to shunt any potentially damaging voltage surges around the transistor 40 to afford further protection and increase circuit reliability. The resistor 18 in shunt with the control transistor 50 enables the latter to operate at a reduced power level and also advantageously aids in the buildup of generator field upon starting by providing a low impedance path for the field current.

Of special note is the fact that all of the transistors of the control circuit are outside the circuit path through which the generator output currents flow. A problem of prior art regulating arrangements utilizing transistors has been their susceptibility to destruction where they are arranged to directly control the regulated currents and the limitations imposed by the limited current handling capabilities of serially connected transistors. Moreover, the amplifying arrangement which places the transistors outside the direct path of the load current enhances the speed of response to changes in the output voltage furnished by the alternator 10.

Another advantage offered by the arrangement shown in FIG. 1 is that the frequency of the alternator 10 does not affect the operation of the control circuit since no capacitors are used therein in achieving the control. For example, an exemplary arrangement has satisfactorily regulated the output voltages of alternators generating alternating current at 50, 60, 400 and 800 cycles per second.

Figure 2:
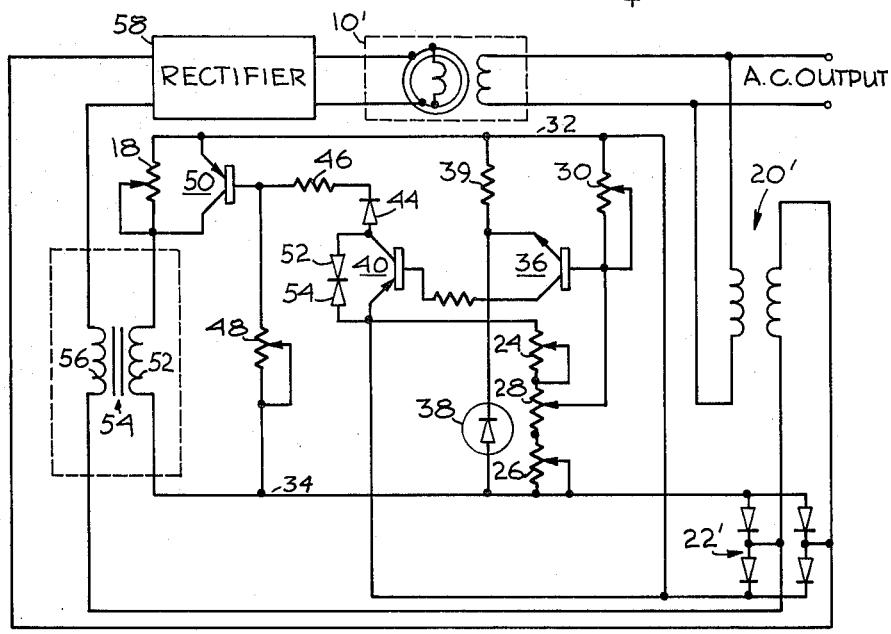
FIG. 2 is a schematic drawing of another exemplary circuit in accordance with the invention having a regulator including a magnetic amplifier to control the voltage output of a single phase alternator.

Another feature of the invention relates to the fact that the control circuit may be used to control either A.C. or D.C. output signals and may be used in cooperation with static, as well as rotating, voltage sources. For example, in FIG. 2 is shown an arrangement including a magnetic amplifier for controlling the output voltage of a single phase alternator. The output voltage furnished by a single phase alternator 10′ is sensed by means of a transformer 20′ and a full wave rectifier 22′. The resulting unidirectional voltages furnished by the rectifier 22′ are applied to the comparison circuit at the base terminal of the transistor 36 and the emitter terminal of a transistor 40 to control the current through a control transistor 50, as explained above in connection with FIG. 1. The transistor 50 is connected to control the current supplied to a control winding 52 of a magnetic amplifier 54.

It should be noted that the control current is derived from the rectifier 22′ so that the entire arrangement is self-excited (as is the arrangement of FIG. 1), eliminating the necessity for external power sources and thereby reducing the size and cost of the arrangement. The self-excitation is completed in the arrangement of FIG. 2 by deriving the field current supplied to the alternator 10′ from the transformer 20′ via a rectifier 58 and a main winding 56 of the magnetic amplifier 54.

In operation, as the output voltage furnished by the alternator 10′ increases above a selected output level, the transistor 50 is rendered less conductive, and the control current through the winding 52 decreases to apply a decreased biasing field to the magnetic amplifier 54. This increases the impedance presented by the main winding 56, thus decreasing the current furnished to the field winding of the alternator 10′. On the other hand, when the output voltage of the alternator 10′ fluctuates below the selected output voltage, the transistor 50 is rendered more conductive, the bias field of the magnetic amplifier 54 is increased and an increased current flows to the field winding of the alternator 10′.

Figure 3:
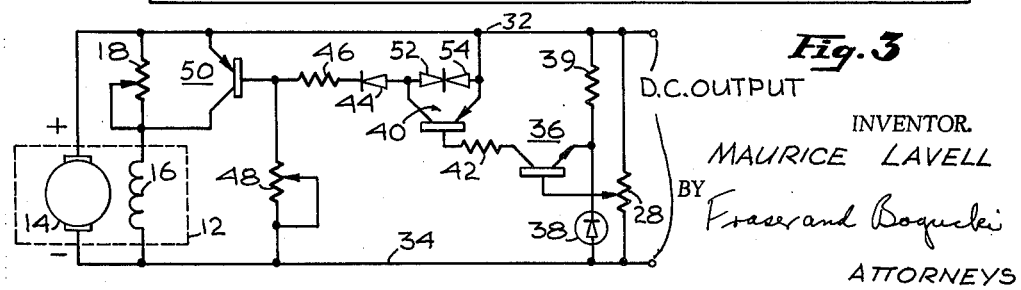
FIG. 3 is a schematic diagram of a third exemplary circuit in accordance with the invention wherein a regulator is utilized to control the output of a D.C. generator.

In FIG. 3 there is shown another arrangement in accordance with the invention specifically adapted to regulate the output voltage of a self excited, D.C. generator such as the type used in an automobile. In order to further reduce the size and cost of the arrangement, certain of the variable resistors have been eliminated from the regulating circuit. However, since an automobile generator is intended to provide a precise voltage level within relatively narrow limits, the circuit shown is capable of providing the desired regulation.

In the circuit of FIG. 3, the potentiometer 28 is connected directly across the armature winding 14 of the D.C. generator 12 by the conductors 32 and 34 to sense the output voltage for application at the base terminal of the transistor 36. The transistor 40 has its emitter terminal directly connected to the positive side of the armature winding 14 by the conductor 32. Thus, the transistors 36 and 40 provide a comparison in response to changes in the output voltage to vary the conductive condition of the transistor 50, as explained above with regard to the arrangement of FIG. 1. The conductive condition of the transistor 50 directly controls the magnitude of current furnished the field winding 16 and thereby maintains the proper D.C. output voltage across the armature winding 14.

It should be noted that the potentiometer 28 and the variable resistor 48 are retained in the circuit of FIG. 3 in order to allow the adjustment of the gain of the transistors 36 and 50 for selection of a proper control characteristic. The potentiometer 28 and the variable resistor 48 also permit minor adjustments which may be necessary when one of the transistors is replaced in the circuit.

Although there have been described above specific arrangements for regulating the output voltages furnished by D.C. and A.C. generators for the purpose of illustrating the manner in which the invention may be used to advantage, it will be appreciated that the invention is not limited thereto. Accordingly, any and all modifications, variations or equivalent arrangements falling within the scope of the annexed claims should be considered to be a part of the invention.

What is claimed is:

1. A voltage regulating circuit for controlling the level of output voltage produced by a generator comprising a generator having a shunt field winding for controlling the output voltage thereof, first and second sensing transistors, each having input and output electrodes, coupled to sense the output voltage produced by the generator, means connecting said first transistor in a signal inverting circuit configuration, a constant voltage element coupled to one of the input electrodes of the first transistor for providing a reference voltage, means connecting an output electrode of the first transistor to an input electrode of the second transistor for applying thereto a signal of an opposite direction from the voltage change actually encountered at the generator output, a third transistor having input and output electrodes and coupled to control the current in the generator field winding, a variable resistor connected in shunt with the third transistor, and means coupling the output electrode of the second transistor to the input electrode of the third transistor.

2. A voltage regulating circuit for controlling the level of output voltage produced by a generator comprising a generator having a shunt field winding for controlling the output voltage thereof, first and second transistors, each having input and output electrodes, coupled to sense the output voltage produced by the generator, means connecting said first transistor in a signal inverting circuit configuration, a constant voltage element coupled to one of the input electrodes of the first transistor for providing a reference voltage, means connecting an output electrode of the first transistor to an input electrode of the second transistor for applying thereto a signal of an opposite polarity from the voltage change actually encountered at the generator output, breakdown diode protection means connected in shunt with the second transistor for providing overload protection, a third transistor having input and output electrodes and coupled to control the current in the generator field winding, and means coupling the output electrode of the second transistor to the input electrode of the third transistor.

3. A voltage regulating circuit in accordance with claim 2 wherein the last mentioned means comprises a diode rectifier for isolating the second transistor from voltages of a particular polarity.

4. A voltage regulating circuit for controlling the level of output voltage produced by a generator comprising a generator having a shunt field winding for controlling the output voltage thereof; first and second sensing transistors, each having input and output electrodes, coupled to sense the output voltage produced by the generator; means coupling the output electrode of the first transistor to the input electrode of the second transistor; a constant voltage element coupled to one of the input electrodes of the first transistor for providing a reference voltage at said one input electrode; a third transistor having input and output electrodes; means coupling the output electrode of the second transistor to the input electrode of the third transistor; and control means connected between the output electrode of the third transistor and the generator field winding for controlling current in the field winding in response to control signals developed by the third transistor, said control means comprising a magnetic amplifier having a control winding connected to the output electrode of the third transistor and having a main winding connected in series between a source of A.C. voltage and the generator field winding.

References Cited by the Examiner
UNITED STATES PATENTS 2,776,382    1/1957    Jensen.
2,892,143    6/1959    Sommer.

LLOYD McCOLLUM, *Primary Examiner.*